United States Patent Office 3,634,224
Patented Jan. 11, 1972

3,634,224
APPARATUS FOR SUPPORTING ELECTRODES, PARTICULARLY SUITED FOR SUSPENDED ELECTRODES USED IN MULTICELL FURNACES FOR THE PRODUCTION OF ALUMINUM
Giorgio Olah de Garab, Milan, and Domenico Corfiati, Gallarate, Italy, assignors to Montecatini Edison S.p.A., Milan, Italy
Filed June 2, 1969, Ser. No. 829,342
Claims priority, application Italy, June 7, 1968, 17,446/68
Int. Cl. C23b 3/02, 5/70
U.S. Cl. 204—297 R                    10 Claims

ABSTRACT OF THE DISCLOSURE

An apparatus is disclosed for supporting electrodes for electrolytic cells, and in particular suspended electrodes used in multicell furnaces for the production of aluminum, the apparatus consisting of two arms aligned in a substantially horizontal position, with their adjacent ends connected with the electrode in order to form a single rigid beam; each arm ending, at its free end opposite to the end connected to the electrode, with an articulated joint substantially shaped like a T lodged in a recess of a trolley constrained to move along a suitable guide running parallel to the longer side of the bath holding vat; each arm being provided with insulating means adapted to interrupt the electrical and thermal flow between said T-shaped joint and the remaining part of the arm; each one of said arms being subdivided into two half-arms removably connected to each other by means of a clamp suited for allowing predetermined rotations of the electrode-carrying half-arm with respect to the half-arm ending with the T-shaped joint; and adjusting means at the ends of each one of said horizontal trolley-carrying guides.

The present invention relates to apparatus for supporting electrodes of electrolytic cells used in the production of metals from their oxides. More particularly, the apparatus is especially suited for electrodes of the suspended type used in the so-called multi-cell furnaces employed in the electrolytic production of aluminum from $Al_2O_3$ in molten salts (cryolitic baths).

As is well known in the art, the electrodes for multi-cell furnaces consist of carbonaceous material or graphite and are used in groups or series of electrodes arranged in parallel relation to each other, in a vertical or a slanting position. The end electrodes are directly-fed monopolar electrodes, while the intermediate electrodes, which are not directly fed, behave as bi-polar electrodes.

These series of electrodes are generally supported by rigid systems, insulated where necessary, and connected to longitudinal or transversal bars extending along the side walls of the vats holding the electrolytic bath. In general, the supporting bars are movably mounted on guides in order to allow the displacement of the electrodes along the longitudinal axis of the vats or tanks for obvious purposes of regulation, for varying the interpolar distance, and for purposes of maintenance.

It is also well known that the carbonaceous material of which the electrodes are made tends to warp during operation, both because of thermal expansion as well as because of soaking by the bath.

Furthermore, since this carbonaceous material by its very nature has little elasticity, if the electrodes are connected to a rigid supporting structure, cracks and even breakages may occur in said electrodes during operation.

The object of the present invention is therefore to provide an apparatus suitable for eliminating all the above-mentioned serious drawbacks while being sufficiently rigid for maintaining the electrodes in the position required by the specific electrolytic process, that is, in a predetermined slanting position. The apparatus is furthermore sufficiently articulated to be yielding and, thus, readily able to absorb the distortions and possible displacements of the electrodes, thereby avoiding their deformation and breakage during use.

Another object of this invention is to provide an apparatus which will allow the transverse displacement of the electrodes (while keeping constant their predetermined slant) in the sense of the current flow through the bath, and at the same time permitting the interpolar distance to be varied according to operating requirements.

These and still further objects, which will become even more apparent to those skilled in the art from the detailed description that follows, are conveniently achieved by the present invention which contemplates an apparatus for the support of electrodes for electrolytic cells, and more particularly for suspended electrodes for multi-cell aluminum furnaces, which apparatus consists of two arms aligned in a substantially horizontal position, with their contiguous ends connected with the electrode mass through clamping means arranged to permit the two arms to form one single rigid beam;

Each arm ending, at its free end opposite the end connected to the electrode, with a substantially T-shaped joint or articulation, lodged in a cavity or recess provided on a carriage sliding on a straight guiding rail arranged externally and parallel to the longer side of the vat holding the electrolytic bath;

Each arm furthermore being provided with insulating means arranged to interrupt the electrical contact and the thermal flow between the T-joint and the remaining part of the arm itself;

Each arm being furthermore subdivided into two half-arms, removably joined to each other by means of a coupling-clamp which allows the turning on its axis of the electrode-carrying half-arm with respect to the half-arm ending with the T-shaped joint;

Adjusting means being further provided for vertical adjustments under each horizontal carriage guide.

This invention will now be described in greater detail according to a preferred embodiment, and with reference to the attached drawings which are given for purely illustrative and not limiting purposes, and wherein.

Figure 4:
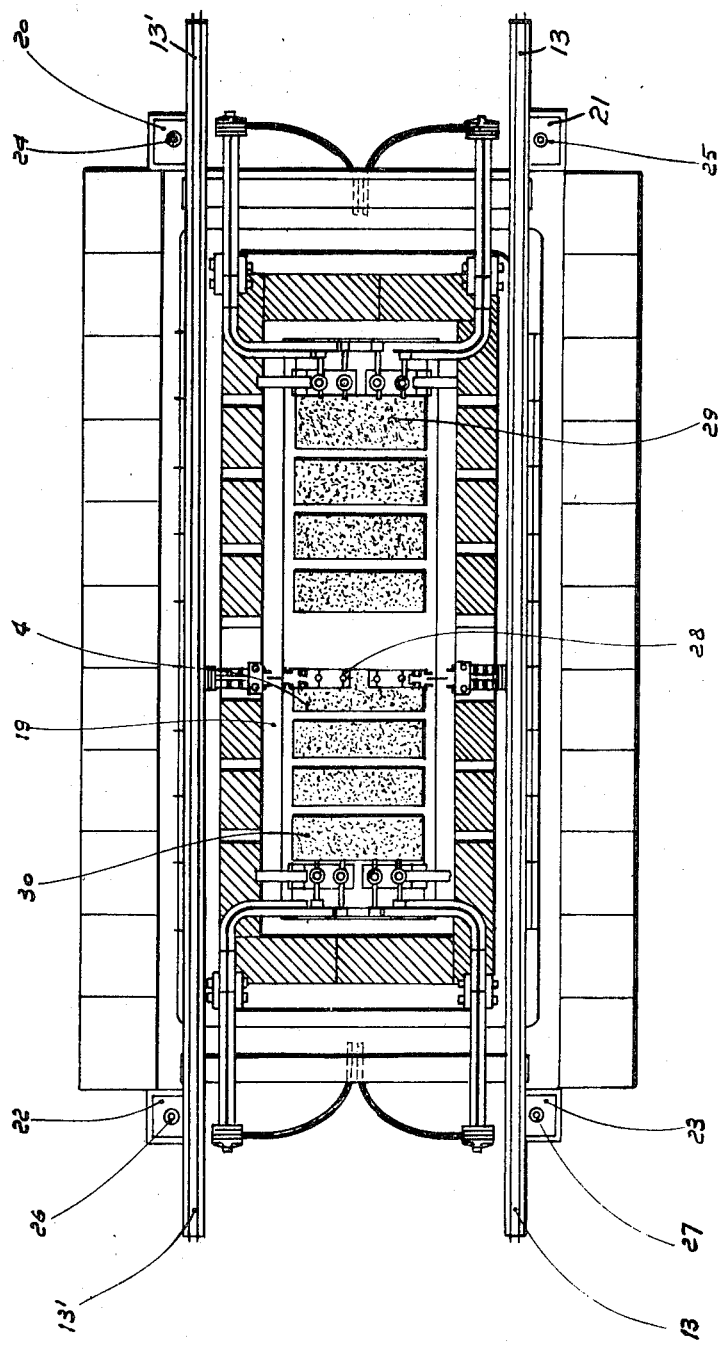
FIG. 4 is a schematic plan view of a multicell furnace fitted with a complete apparatus of this invention, shown in operating position.

As shown in FIG. 4, and as it will be explained in greater detail hereinafter, the electrode-supporting apparatus of this invention consists of two similar structures aligned in a substantially horizontal position and connected to an electrode in such a way as to form with the latter one single continuous beam resting on its ends.

In the description that follows, for reasons of simplicity only one electrode-supporting structure will be described, it being understood that the other is identical with the former and arranged symmetrically with respect to it. Thus, with reference to the various figures, and particularly FIG. 1, the portion of the apparatus under consideration may be described as consisting substantially of a supporting arm subdivided into two half-arms 1 and 2.

One end of the half-arm 1 is connected by means of bars 3 and 3′ (which are substantially nipples or threaded pins) to electrode 4. One end of each bar 3 and 3′ fits (with a certain predetermined clearance) into a hole made into the half-arm 1 and held there by wedges or cotters 5 and 5′, the other end being screwed into the electrode mass 4.

The other end of half-arm 1, of cylindrical shape, is fastened (with the possibility of being rotated through any angle about its axis, thereby imparting to the electrode 4 the desired predetermined inclination) in a clamp 6 consisting of two opposing plates 7 and 7′, which are tightened about the half-arm 1 through screw-bolts 8 and 8′ with suitable screw-nuts. In order to ensure a perfect locking of the clamp 6, the base plate 7, which is integral with half-arm 2, has a zone, in contact with the cylindrical part of half-arm 1, which forms a substantially semi-trapezoidally shaped seat for the half-arm 1.

Figure 2:
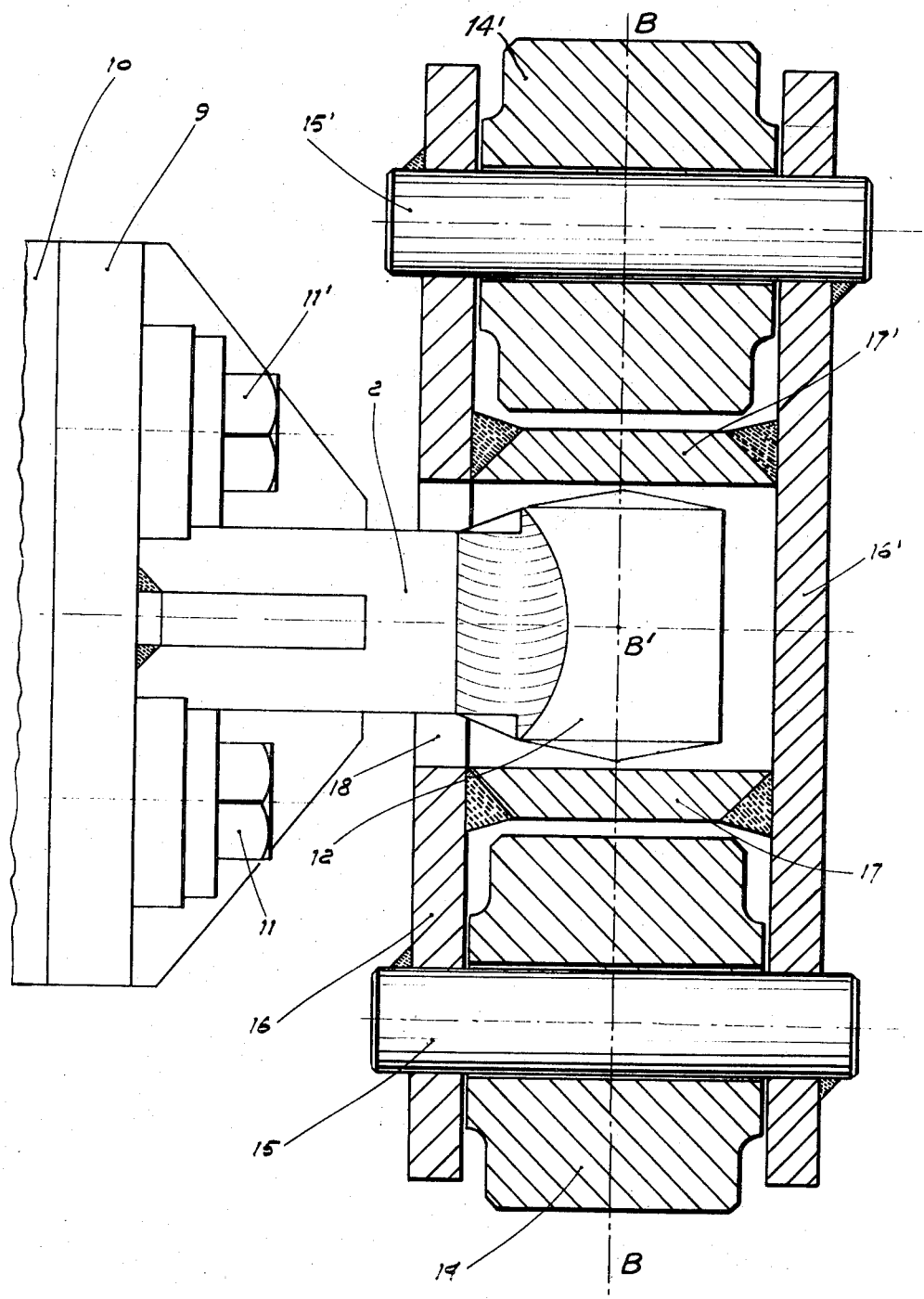
FIG. 2 is a longitudinal cross-section of a detail of the apparatus of FIG. 1.

On half-arm 2, in an intermediate position, there is arranged a suitable coupling consisting of two opposing flanges 9 and 9′, between which lies a layer 10 made of a material of high electrical and thermal resistivity, as for instance asbestos. The two opposing flanges 9 and 9′ are held tightly by bolts 11 and 11′, etc. (FIG. 2).

The specific function of the insulated coupling is that of interrupting both the electrical contact and the thermal flow between the two parts of the coupling without weakening the mechanical stiffness of the half-arm 2 and thus of the whole structure.

Half-arm 2, on the end opposite the end carrying the clamp 6, ends with a T-shaped joint 12. This joint is formed by a small cylinder connected crosswise to the head of half-arm 2 and is freely lodged in a recess provided on a trolley or carriage sliding between two superimposed guiding tracks 13 and 13′. The trolley runs on two rollers 14 and 14′, free-wheeling on horizontal journals 15 and 15′ (see FIGS. 2 and 3), which are keyed to two opposing brackets or plates 16 and 16′. A parallelepiped-shaped recess or cavity, suited for holding said T-shaped joint 12, is thus defined by longiutdinal brackets 16 and 16′, cross-plates 17 and 17′ and said two tracks 13 and 13′.

In bracket 16 a slot 18 is provided for the introduction of the T-shaped joint 12 into the recess and for allowing a number of predetermined rotational motions of the joint 12 in said recess.

Figure 3:
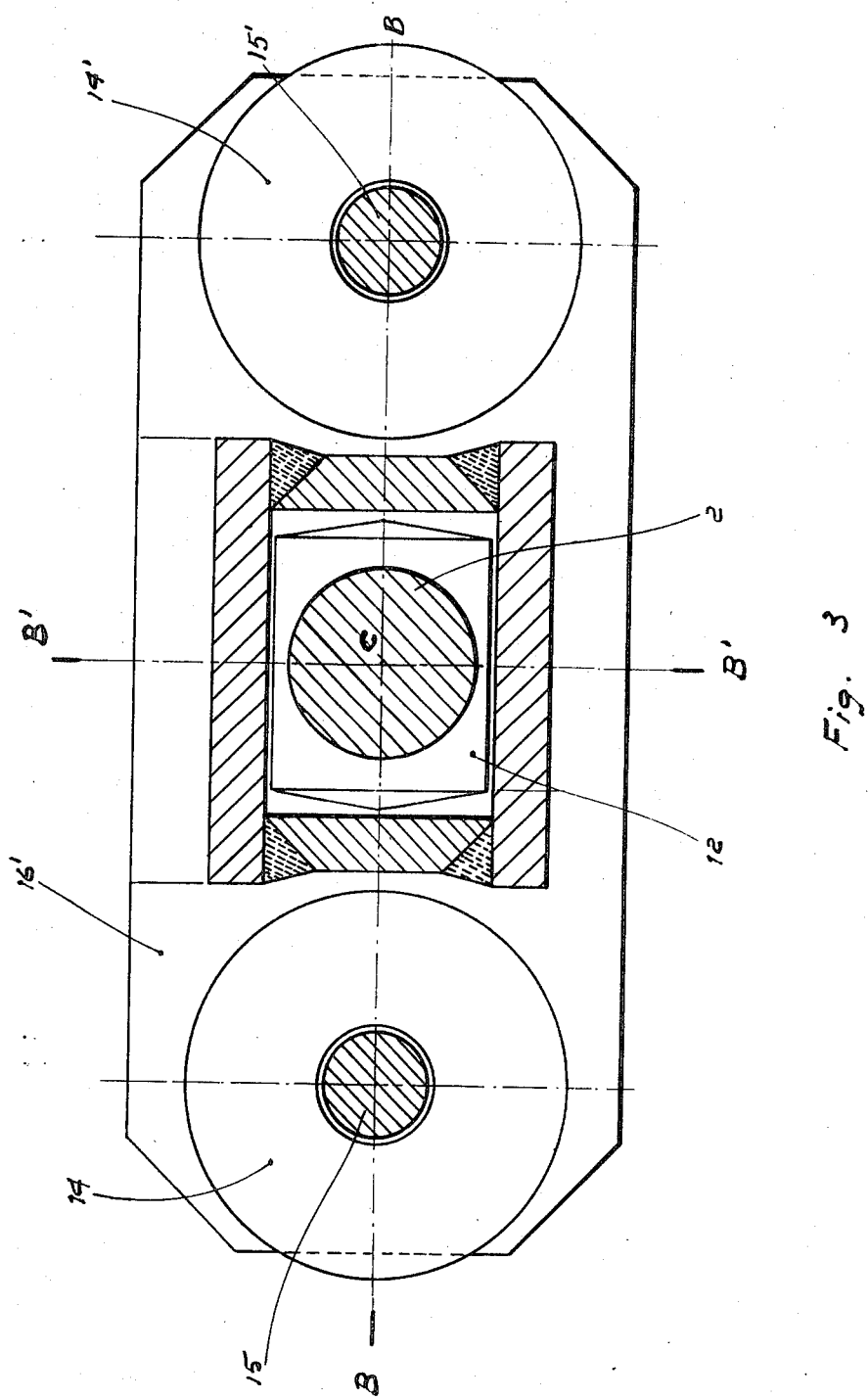
FIG. 3 is a cross-section taken at 90° of the same detail of FIG. 2.

As clearly shown in the attached figures, and particularly FIGS. 2 and 3, the shape and size of the parallelepiped-shaped recess or cavity and of the T-shaped joint are selected as to allow the T-shaped joint, once it has been inserted into the recess, to effect only the following movements:

(a) a limited rotation around axis B—B (see FIGS. 2 and 3);

(b) a limited rotational movement around the axis at right angles to the plane of FIG. 2 and passing through B′ (in FIG. 3 said rotation occurs around axis B′—B′)

Figure 5:
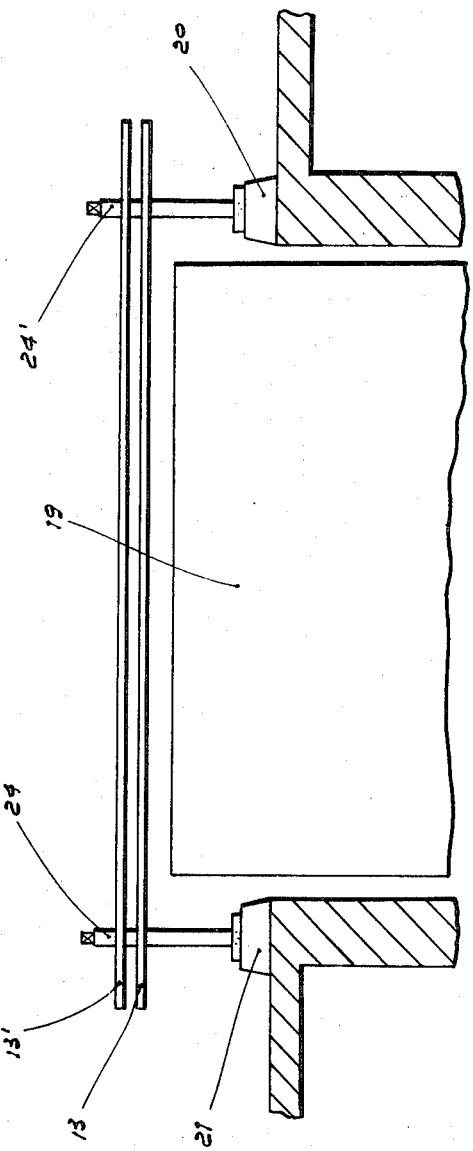
FIG. 5 is a schematic view (in partial cross-section) of a further detail of the apparatus of FIG. 1.

The T-shaped joint may, furthermore, effect the following additional movements (see FIGS. 1 and 4):

(c) a motion of horizontal translation together with and by means of said trolley or carriage, which in turn is constrained to move along the superimposed guides 13 and 13′; this motion of translation may be carried out either manually or mechanically;

(d) a motion of vertical translation, that is, in a direction normal to the direction of travel of the trolley, by means of a lifting system (FIG. 5) acting, as will be seen later on, under the supporting ends of said superimposed guides 13 and 13′.

FIG. 3 shows that the articulated T-joint 12 cannot effect any rotational motion around its own longitudinal axis, that is, around the axis disposed at right angles with respect to the plane of FIG. 3 and passing through point C.

Figure 1:
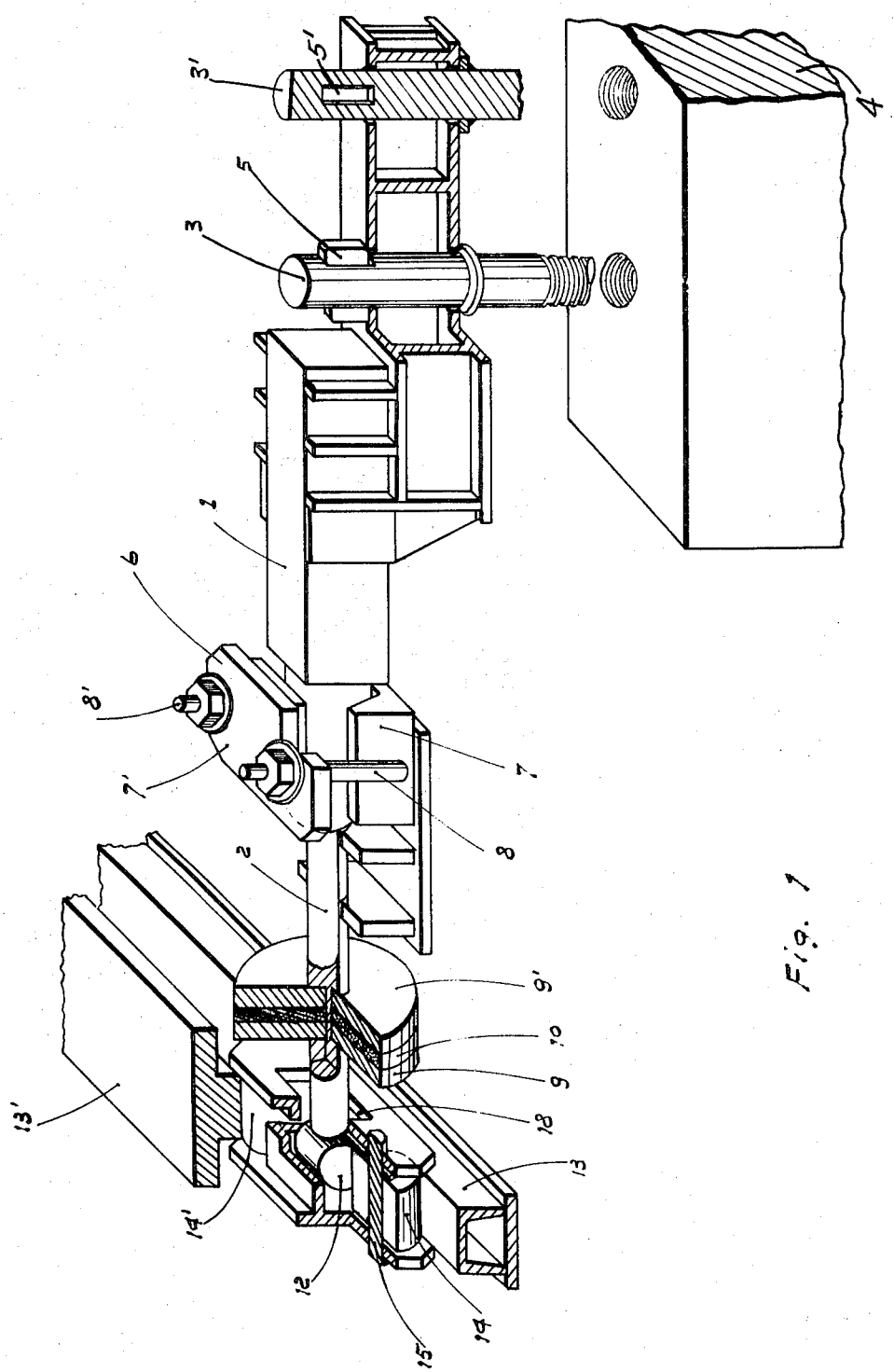
FIG. 1 represents a perspective view, in partial cross-section, of an electrode-supporting apparatus according to this invention.

This longitudinal axis of the T-joint 12 coincides with the longitudinal axis of the cylindrical end of half-arm 1 to which the electrode 4 is fixed (see FIG. 1).

From the foregoing it will be quite evident that, for the purposes of solving the technical problem to which this invention is addressed, the rotational and translational motions permitted to and by the apparatus are those, and only those, which allow the apparatus to adsorb, without rigidly resisting, the warpings both of the electrodic material (i.e., the linear expansion and/or bendings due to thermal expansion or to soaking by the bath) as well as of the supporting structures (linear expansion), leaving unvaried the original position of the suspended electrode.

The trolley is constrained to move horizontally between the pair of guides consisting of two parallel superimposed rails 13 and 13′. These guides are disposed (FIGS. 4 and 5) parallel to and externally of the side walls forming the major dimension of the vat 19 of a rectangular multicell furnace. However, according to a variant of this invention, these guides may be made integral with the vat itself, in which case the vertical translational motion mentioned above under item (d) will be hindered.

The preferred arrangement according to this invention, however, is that which includes means for lifting and lowering the electrode system with respect to the vat. This is achieved by mounting the pair of guides 13 and 13′ on four columns 20, 21, 22 and 23 (see FIGS. 4–5) placed at or near the corners of the rectangular vat, so as to permit the lifting and lowering of the pair of guides with respect to the vat, by operating suitable worm-screw jacks 24, 25, 26 and 27 of per se conventional construction. In this way it becomes possible to impart to the guides and, thus to the trolleys sliding on them, a vertical displacement as explained above under item (d).

FIG. 4 shows a schematic plan view of a vat 19 with only one apparatus 28 in operation, an apparatus which, as already explained, is formed by two supporting structures as illustrated in FIG. 1, mounted in horizontal alignment and having their respective half-arms connected to an electrode 4. The same FIG. 4 shows the other bipolar electrodes and the two directly-fed mono-polar head electrodes 29 and 30.

What is claimed is:

1. An apparatus for supporting electrodes for electrolytic cells, said apparatus comprising:

two arms aligned in a substantially horizontal position, with their adjacent ends connected with the electrode in order to form a single rigid beam;

each arm ending, at its free end opposite to that connected to the electrode, with an articulated joint substantially shaped like a T lodged in a recess of a trolley constrained to move along a suitable guide running parallel to the longer side of the bath holding vat;

each arm being provided with insulating means adapted to interrupt the electrical and thermal flow between said T-shaped joint and the remaining part of the arm;

each of said arms being subdivided into two half-arms removably connected to each other by means of a clamp adapted to allow predetermined rotations of the electrode-carrying half-arm with respect to the half-arm ending with the T-shaped joint;

and adjusting means at the ends of each of said horizontal trolley-carrying guides.

2. Apparatus according to claim 1, wherein the supported electrodes are suspended electrodes employed in multicell furnaces for the electrolytic production of aluminum.

3. Apparatus according to claim 2, wherein the T-shaped joint comprises a small cylinder connected to the free end of said half-arm, and having its geometrical axis disposed at 90° with respect to that of the half-arm itself.

4. Apparatus according to claim 2, wherein the sliding trolley, in which there is a recess for lodging said T-shaped joint, comprises free-wheeling rollers running between two super-imposed and parallel rails and kept coplanar by opposing brackets adapted to define internally said T-joint holding recess.

5. Apparatus according to claim 1, wherein the recess formed in the trolley has substantially the shape of a parallelepipedon, and is so dimensioned as to allow the T-shaped joint lodged in it to effect only two partial rotational motions, one being around the geometrical axis of the small cylinder of the joint and one being around an axis normal to that of the joint but disposed at 90° with respect to the geometrical axis of the half-arm.

6. Apparatus according to claim 1, wherein said insulating means are interposed between said T-shaped joint and said half-arm blocking clamp, and comprise a coupling formed by two opposing flanges removably fastened together, there being interposed between these flanges one or more layers of a material of high electrical and thermal resistivity.

7. Apparatus according to claim 6, wherein the said electrical and thermal-resistant material is asbestos.

8. Apparatus according to claim 1, wherein said clamp for the connecting of said half-arms comprises two opposing plates, one of which is integral with the T-joint-carrying half-arm, and both so constructed and arranged as to removably clamp between them the cylindrical end of the electrode-carrying half-arm, thereby enabling the latter to be rotated through any desired angle around its axis.

9. Apparatus according to claim 1, wherein said adjusting means are constructed and arranged to act in a vertical direction under the said horizontal trolley-guiding-rails, and comprise worm-screws mounted on fixed supports at or adjacent the four corners of the electrolytic bath holding vat acting directly underneath said longitudinally extending trolley-guiding-rails.

10. Apparatus according to claim 1, wherein the longitudinal guide-rails are associated integrally with the electrolytic bath-holding vat itself.

References Cited

UNITED STATES PATENTS

| | | | |
|---|---|---|---|
| 3,404,081 | 10/1968 | Cummings et al. | 204—243 R |
| 3,404,082 | 10/1968 | Henkie | 204—243 R |
| 3,409,531 | 11/1968 | Ryerson et al. | 204—297 R X |
| 3,410,786 | 11/1968 | Duclaux et al. | 204—297 R |
| 3,455,809 | 7/1969 | Geilert | 204—297 R X |
| 3,484,856 | 12/1969 | Bogantes | 204—297 R |

FOREIGN PATENTS 1,023,418    3/1966    Great Britain.

JOHN H. MACK, Primary Examiner

R. J. FAY, Assistant Examiner

U.S. Cl. X.R.

204—243 R